United States Patent [19]

Cattani

[11] Patent Number: 4,670,283

[45] Date of Patent: Jun. 2, 1987

[54] METHOD FOR SHAPING ICE CREAMS AND FOOD ARTICLES OF CREAMY CONSISTENCY

[75] Inventor: Luciano Cattani, Milan, Italy

[73] Assignee: Sauer S.p.A., San Giuliano Milanese, Italy

[21] Appl. No.: 787,967

[22] Filed: Oct. 15, 1985

Related U.S. Application Data

[62] Division of Ser. No. 695,856, Jan. 28, 1985, Pat. No. 4,648,829.

[30] Foreign Application Priority Data

Feb. 13, 1984 [IT] Italy ............................... 19593 A/84
Feb. 13, 1984 [IT] Italy ............................... 19594 A/84

[51] Int. Cl.$^4$ ............................. B29C 1/00; A23L 1/42; A23G 9/00
[52] U.S. Cl. ................................. 426/512; 426/317; 425/326.1; 425/405 R; 425/437; 264/335; 264/500
[58] Field of Search ............... 426/512, 515, 312, 317; 425/326.1, 405 R, 437; 264/335, 500

[56] References Cited

U.S. PATENT DOCUMENTS 2,733,493  2/1956  Bryer ................................... 264/335
3,251,319  5/1966  Raupert ............................... 426/515

FOREIGN PATENT DOCUMENTS 2078155A  1/1982  United Kingdom ................ 425/437

*Primary Examiner*—Jeanette Hunter
*Attorney, Agent, or Firm*—Browdy and Neimark

[57] ABSTRACT

The invention is concerned with the technical field of food article processing, and in particular relates to a method for shaping ice creams and articles of creamy consistency.

The technical problem to be solved was that of quickly and accurately shaping articles of a creamy type with the same already provided with volume and consistency features which substantially approximate the final ones.

The solution to the problem is provided by a method comprising at least one shaping step carried out by applying to said articles at least one air-pervious die and simultaneously blowing in air through said die.

3 Claims, 12 Drawing Figures

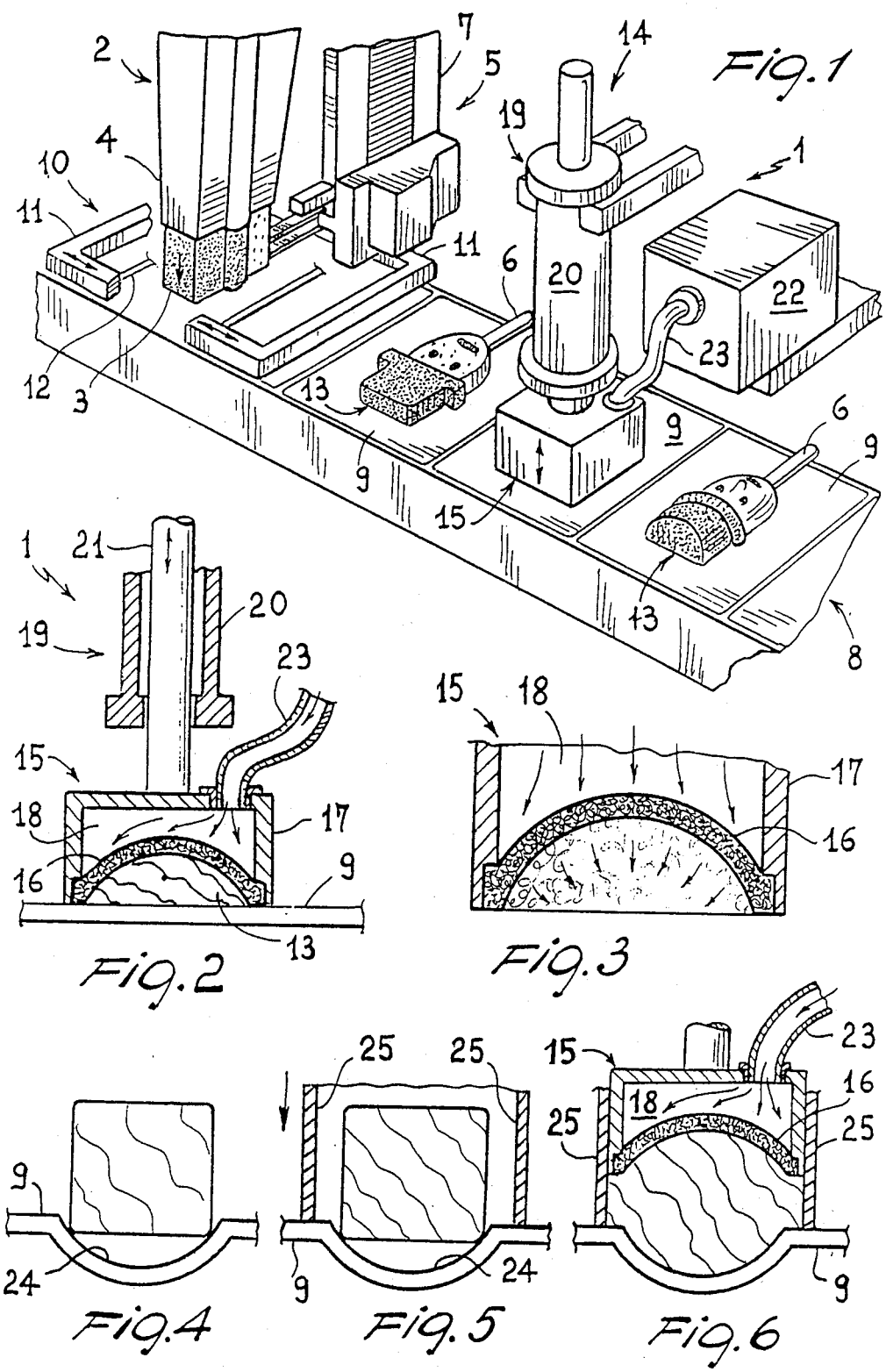

METHOD FOR SHAPING ICE CREAMS AND FOOD ARTICLES OF CREAMY CONSISTENCY

This is a division of application Ser. No. 695,836 filed Jan. 28, 1985, now U.S. Pat. No. 4,648,829.

BACKGROUND OF THE INVENTION

This invention relates to a method for shaping ice creams and the like food articles, such as "semifreddo", of a thick and creamy nature.

As is known, there exists many products in the food processing field the valuability whereof is also dependent on the their shapes. Typical is the instance of ice creams, such as ice creams fitted with a stick of popsicles, wherein shape is often a determining factor in prompting the consumer's preference.

The possibility of shaping or fashioning in a quick and accurate way the cited products, after the same have been substantially finished as regards volume and physical state, are currently quite limited. In particular, impossible are operations seemingly quite simple and quick to carry out, such as the operations of molding from the outside by pressing with dies reproducing a desired shape. This is mainly due to the fact that application of a die would result in the die becoming naturally stuck. Such sticking of the die, on the one side, hinders the flowing movement of the material being processed, and on the other side, results in partial destruction of an accomplished shape on raising the die. In some instances, where adherence is specially strong, the die raising results in the processed article being raised with it.

The shaping operations, as carried out on the cited articles with the same in a substantially completed state, are not only important to the conferment of particular outward shapes thereon, but also to the achievement of particular "structural" features thereof. In fact, it may be necessary to provide pockets, recesses, grooves and the like whereinto some particular components in addition to those forming the body of the article may be seated.

Such outside operations are impracticable if dies or templates are used which operate from the outside and by deforming the articles in question.

SUMMARY OF THE INVENTION

It is a technical aim of this invention to provide a method which afford the possibility of performing shaping operations which are simple, fast, and of low cost, even where said articles have a volume and a physical consistency which approximate their final ones.

The above aim is substantially achieved by a method of shaping ice creams and the like food articles, which is characterized by at least one processing step carried out by applying to an ice cream or the like an air-pervious contoured die and blowing pressurized air through said die as the latter is being applied.

BRIEF DESCRIPTION OF THE DRAWINGS

Further features and advantages of the invention will be apparent from the following description of some preferred embodiments of a method for shaping ice creams, with reference to the accompanying illustrative drawings, where:

FIG. 1 shows in perspective and in simplified form one portion of a system for the production of ice creams fitted with sticks;

FIG. 2 shows in cross-section a device of FIG. 1, at an isolated position;

FIG. 3 shows one portion of FIG. 2, in an enlarged scale;

FIGS. 4 to 6 illustrate diagramatically the operation of the device of FIG. 2, with the provision of dimpled shaped trays;

DESCRIPTION OF THE PREFERRED EMBODIMENTS

Figure 7:
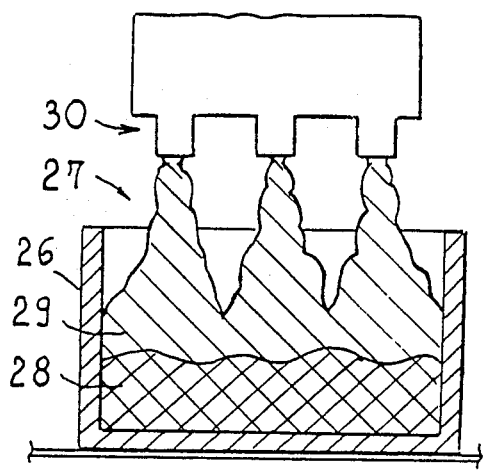
FIGS. 7, 8 and 9 depict the method of this invention as applied to a creamy product in the form of a layered "semifreddo"

With reference to FIG. 1, a device is shown incorporated to a system for the production of ice creams fitted with a stick, or popsicles. The system comprises extruder members 2 adapted to supply a continuous blank 3 of ice cream. Upstream of the extruder members 2, there are located all of the items of equipment required to form the material making up the blank 3. The equipment is of conventional design. Preferably, the blank 3 would be of the composite type, and accordingly, the extruder members 2 provide for co-extrusion by gathering and delivering several ingredients in parallel relationship which have different colors and tastes. Furthermore, as shown in FIG. 1, the extruder members 2 have an extrusion orifice 4 which is contoured to impart the blank 3 with a particular shape, related to the components being co-extruded, so as to provide a given pattern. In the example shown, the extrusion orifice 4 and the various components of the blank 3 are arranged to provide the pattern of a face surmounted by a hat.

Located adjacent the extruder members 2 is a unit 5 operative to automatically drive sticks 6 into the blank 3. The sticks 6 are picked up from a stack 7 of sticks.

The blank 3 issues from the extrusion orifice 4 from top to bottom toward transporting members 8 which convey a plurality of mutually aligned trays 9. The transporting members 8 take the trays 9 along a closed path going through a refrigerating tunnel, not shown and known per se.

Provided between the extrusion orifice 4 and trasporting members 8 are cutter members 10 including a pair of bails 11 holding a pair of cutting wires 12 stretched which confront the blank 3. The bails 11 are driven of reciprocating movements to and away from each other which are related to the rate of formation of the blank 3. In practice, each tray 9 will receive one or more slugs 13, in a flattened state, as they flow from the extrusion orifice 4 and past the cutter members 10. Downstream of the latter is a molding station comprising the device 1, which operate mechanically on the slugs 13 to fashion them.

The device 1, shown at an isolated position in FIG. 2, comprises a forming unit 15 having a contoured die 16 which is pervious to air. The die 16 is a porous metal material construction and is preferably in the form of a sintered metal material filter having the shape to be imparted to the slugs 13. The die 16 is held in a supporting element 17 of box-like construction, wherewith it defines a chamber 18. The supporting element 17 is engaged by drive element 19 controlling the movements of the die 16 and including a fluid-operated cylinder 20 the piston rod 21 whereof is rigid with the supporting element 17.

The device 1 comprises members 22 operative to supply compressed air (FIG. 1) and being connected through a flexible hose 23 to the supporting element 17, the hose 23 reaching the chamber 18 through said supporting element.

The device 1 acts on the slugs 13 in a downward direction, and in FIGS. 1 and 2 is shown to act against substantially flat trays 9. Shown in FIGS. 4 to 6 are instead trays 9 formed with a contoured depression 24 whereon the ice creams would be prearranged. FIGS. 5 and 6 also show that the action of the die 16 may be related to a pair of containment side members 25 driven of reciprocating movements directed perpendicularly to the trays 9. The containment side members 25 would be provided where the action of the die 16 is to be particularly powerful or where the same does not fully engage the side areas of the ice creams to be shaped.

Figure 8:
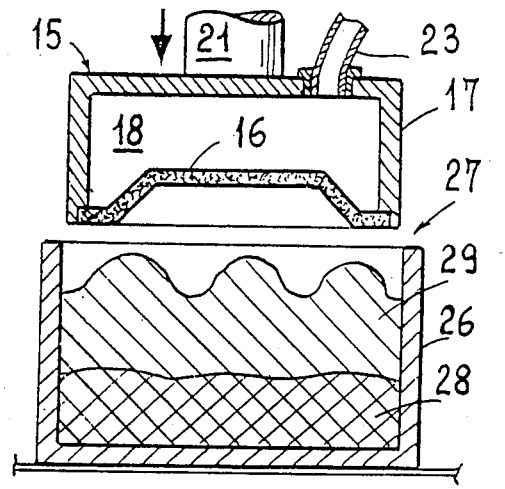
Figure 10:
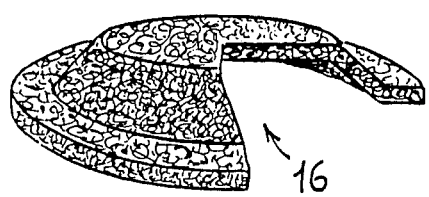
FIG. 10 shows, partly in cut-away view and in perspective, the die used with the device of FIGS. 8 and 9.
Figure 9:
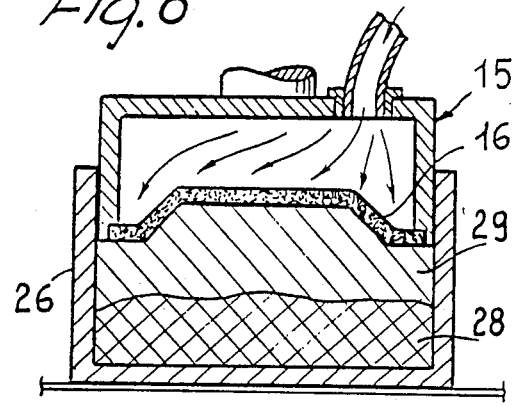

In FIGS. 8 and 9, the device 1 is shown acting inside an open case 26 to shape, for example, a cake contained in the case 26 and having a bottom layer 28 which is relatively hard and an upper layer 29 which is creamy and delivered mechanically from nozzles 30 (FIG. 7).

Figure 11:
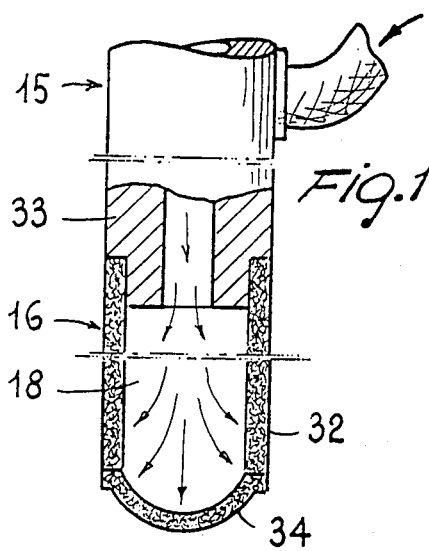
FIGS. 11 and 12 show the construction and application procedure of a device as configured to provide a plunger.
Figure 12:
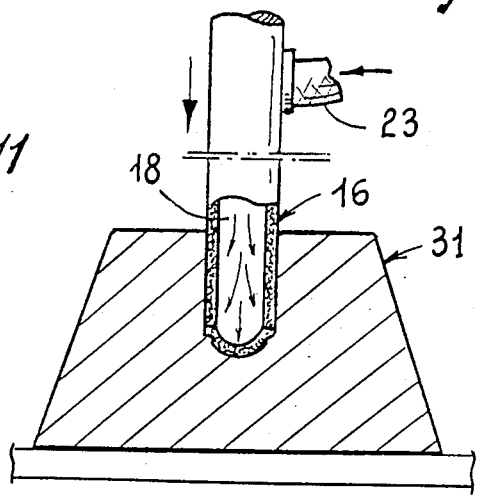

Finally, in FIGS. 11 and 12, the device while being constructionally identical to that of the previous figures, is adapted for forming holes, channels, pockets, and the like in articles 31. In particular, it is contemplated that the die 16 may be substantially configured as a punch or plunger, In fact, it comprises, in the example shown in FIGS. 11 and 12, two elements: a cylindrical band 32 which engages with an engagement element 33, and an end cap 34 of rounded shape and being welded to the cylindrical band 32. The engagement element 33 may also be provided by an end portion of the cited rod 21.

It should be also noted that the compressed air supplied from the operative members 22, comprising in practice either a compressor or connection to a compressed air network, preferably has an overpressure of about one atmosphere, and that higher or lower pressures should be selected according to the consistency of the article being processed.

Furthermore, with the die 16 being formed filter from a sintered metal material, the die pore size would preferably be of about 50 microns.

The device operates as follows.

With reference to FIGS. 1 to 3, the device acts on the slugs 13, as substantially flattened and formed by extrusion followed by cutting. The slugs 13 are taken by the transporting members 8 to the device 1, where they are deformed by the action of the die 16 which is pushed toward the trays 9 by the fluid-operated cylinder 20. FIG. 2 shows that, while the die 16 engages with the slugs 13 from above, pressurized air is introduced into the chamber 18 as supplied from the operative members 22 and conveyed through the hose 23.

The air pressure delivered into the chamber 18 is such as to allow the air to flow through the die 16 but not such as to damage the underlying ice cream.

Operation of the die 16 results in patterning or shaping that face of the slug 13 which confronts the die, as well as, where the trays 9 are dimpled at the middle (FIGS. 4, 5, 6), patterning or shaping that face of the slug 13 which confronts its respective tray 9.

Depending on requirements, the die 16 may be bottomed out onto each slug 13, to contact the trays 9, or alternatively, may apply a more limited action. In the latter case, it may be necessary to provide the containment side members 25 (FIGS. 5 and 6) which prevent the slug 13 under pressure from collapsing at the sides.

With reference now to FIGS. 7 to 9, it may be seen that the device 1 may also act by entering a case 27 wherein an article to be shaped would be located.

FIGS. 11 and 12 show that the device may also act in a quite independent fashion of the elements which support or contain the articles to be shaped, where highly localized deformations are anticipated.

The device disclosed above implements a novel method which forms the subject matter of this invention.

According to this method, the ice cream or the like is first subjected to a shaping step performed from the outside and by combining the pressure of a die with a compressed air jet. The die is rigid but pervious to air, and application of this shaping die is effected while compressed air is blown in through the die itself.

Depending on requirements or preferences, shaping may be effected on a single face of the ice cream or both faces thereof to provide a three-dimensional pattern.

Blowing air through the die is effective to prevent the die from sticking to the article being processed, even though the latter may have a weak consistency and adhere on contact; air will prevent the article material from entering the die pores. Furthermore, the compressed air will prevent the die from behaving as a suction cup on raising it back. The air blown in also forms a thin gap between the die and article being processed, and this gap will favor the flowing movements of material through the article. Thus, it becomes possible to provide extensive deformations or deep recesses without damaging the article on account of irregular flows or entrainment of the material. Where the shaping step described above is carried out with ice cream defined by a plurality of co-extruded components, shaping may be advantageously arranged to differentiate the thicknesses of said components in the ice cream, so as to enhance their presence. Thus, it is possible to produce in a most simple way ice creams in specially attractive and peculiar shapes.

The method of this invention not only is highly efficient and accurate, but also simple and easy to implement at a low cost.

I claim:

1. A method for shaping food articles of a thick and creamy nature comprising:
   extruding the food article;
   applying to the food article an air-pervious contoured die to shape the food article in the configuration of the die while simultaneously blowing pressurized air through said die in order to form a uniform thin air gap between the die and the surface of the article; and
   removing the die from the food article, whereby a shaped food article is provided which bears the configuration of the die.

2. The method of claim 1 wherein, after extrusion, said food product is positioned into a contoured recess, said die is first applied to one face of said food products, and said die is then applied to the opposite face of said food product by positioning said die at the contoured recess.

3. The method of claim 1 wherein said food products are extruded concurrently with being shaped.

* * * * *